Jan. 16, 1968     E. W. HEYBYRNE ET AL     3,363,416
GAS TURBINE ENGINES
Filed Sept. 21, 1966     4 Sheets-Sheet 2
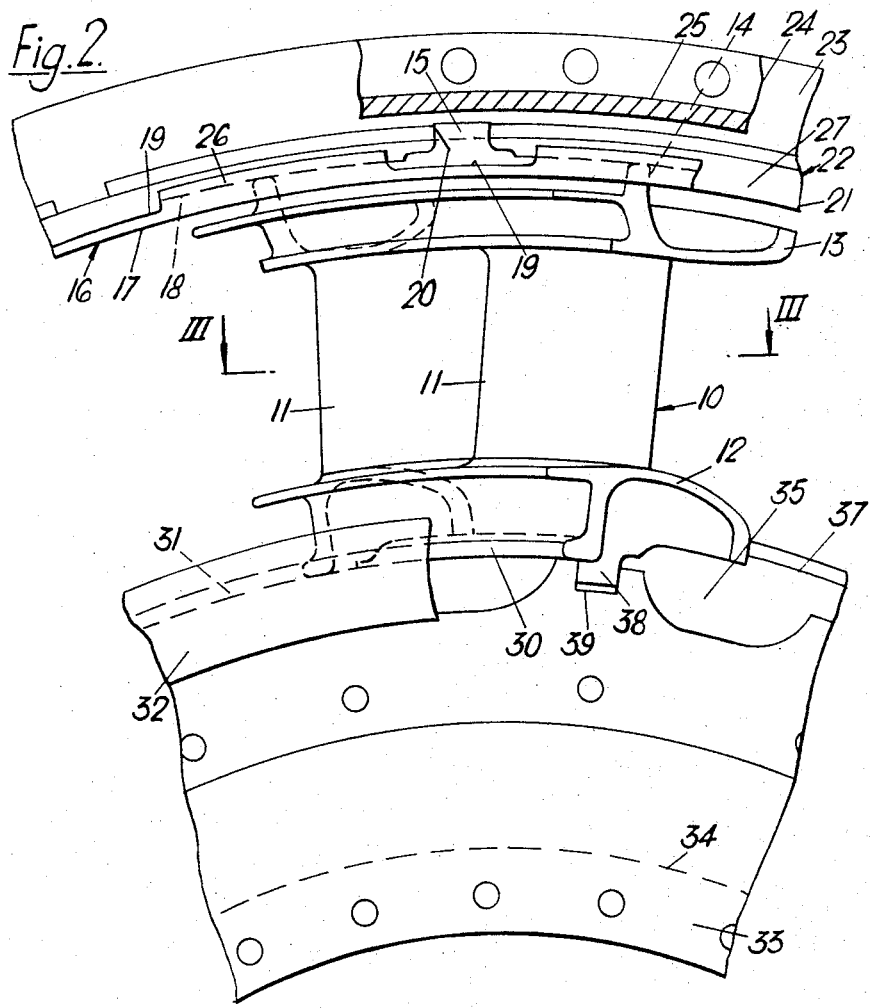
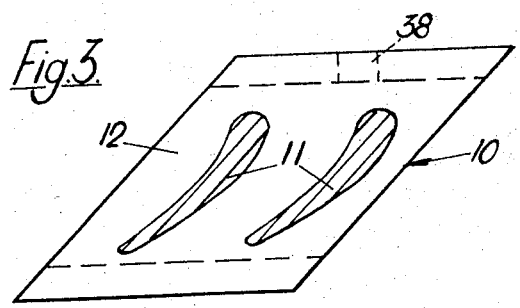
Inventor
ERNEST WILLIAM HEYBYRNE
WALTER JAMES POWELL
By
Bailey, Stephenson Huettig
Attorneys

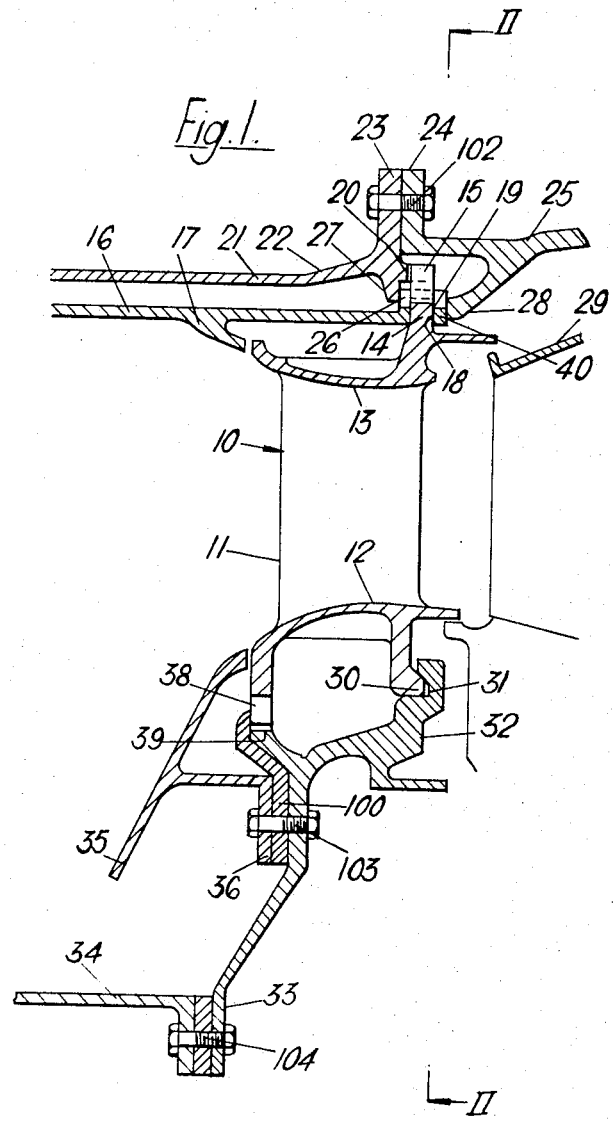

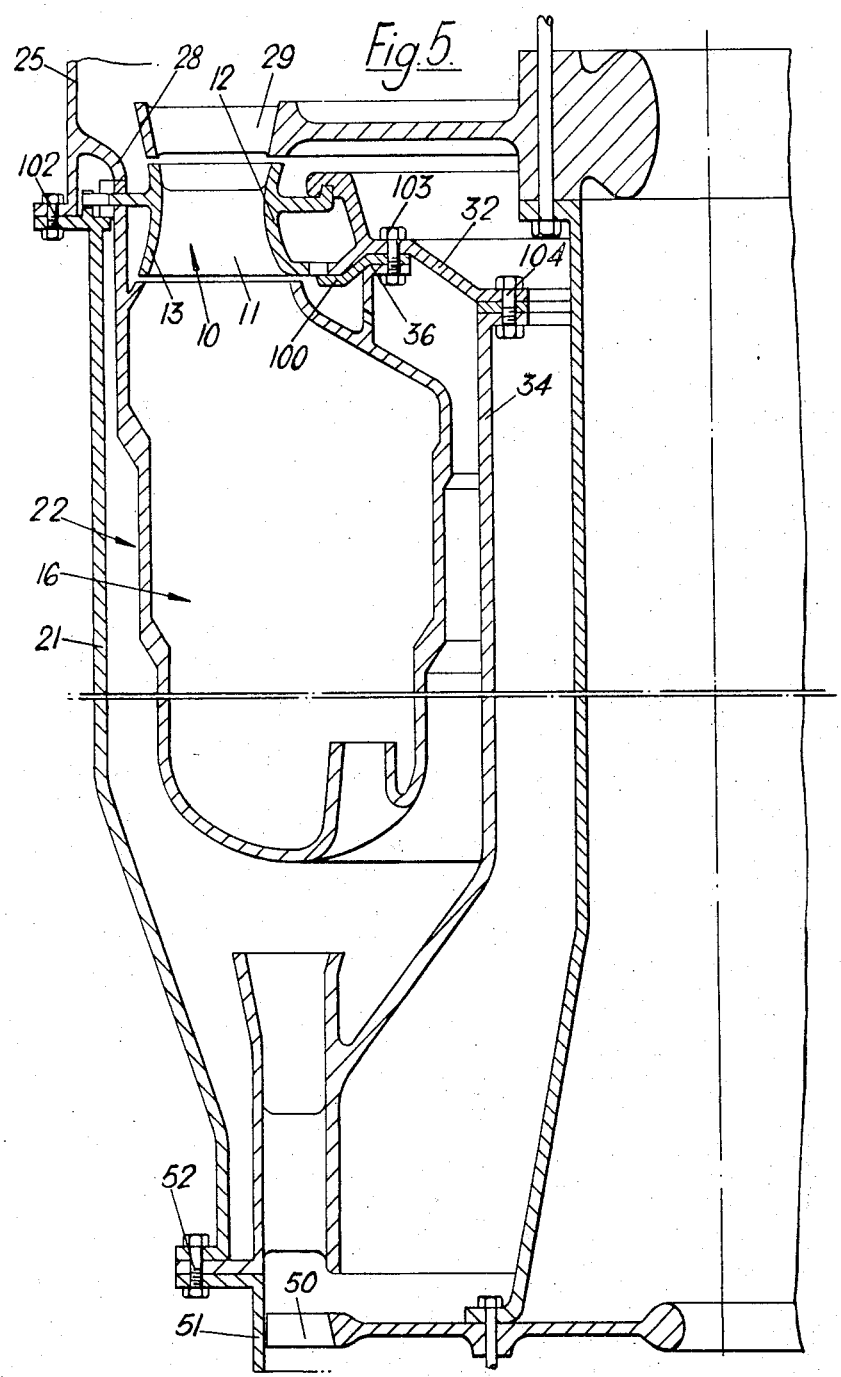

United States Patent Office 3,363,416
Patented Jan. 16, 1968

3,363,416
GAS TURBINE ENGINES
Ernest William Heybyrne and Walter James Powell, Bristol, England, assignors to Bristol Siddeley Engines Limited, Bristol, England, a British company
Filed Sept. 21, 1966, Ser. No. 580,968
Claims priority, application Great Britain, Sept. 21, 1965, 40,222/65
9 Claims. (Cl. 60—39.75)

This invention relates to gas turbine engines.

An object of this invention is to provide improved means for supporting the entry vanes of the turbine, while permitting easy removal or assembly of the vanes and at the same time adequately supporting the adjacent end portion of the combustion chamber of the engine.

A gas turbine engine according to the present invention includes a combustion chamber; a ring of axial flow turbine inlet vanes, the ring consisting of segments, each of which includes at least one vane extending from an outer shroud; and a support structure having an abutment surface facing upstream; the combustion chamber being in engagement with the abutment surface, and each outer shroud having a face which is in engagement with the combustion chamber and during operation of the engine serves to transmit a force in the downstream direction from that shroud to the combustion chamber.

The support structure may be constituted, at least in part, by the turbine casing of the engine. The pressure drop across the vanes assists in pressing the combustion chamber against the turbine casing, thus steadying the combustion chamber against the aerodynamic turbulence it has to withstand. The pressure drop which in practice exists between the exterior and the interior of the combustion chamber will somewhat augment this effect. In this way ease of assembly of the segments is combined with a good support for the combustion chamber.

One embodiment of this invention will now be described with reference to the accompanying drawings which show the turbine inlet assembly of a jet propulsion gas turbine engine and wherein:

FIGURE 1 is a section on an axial plane of the assembly;

FIGURE 2 is a section on the line II—II in FIGURE 1;

FIGURE 3 is a section on the line III—III in FIGURE 2;

FIGURE 5 is a half longitudinal section of the parts of the engine between the compressor and the turbine, shown in the position assumed for assembly, namely with the axis vertical and the turbine end of the engine uppermost.

Figure 4:
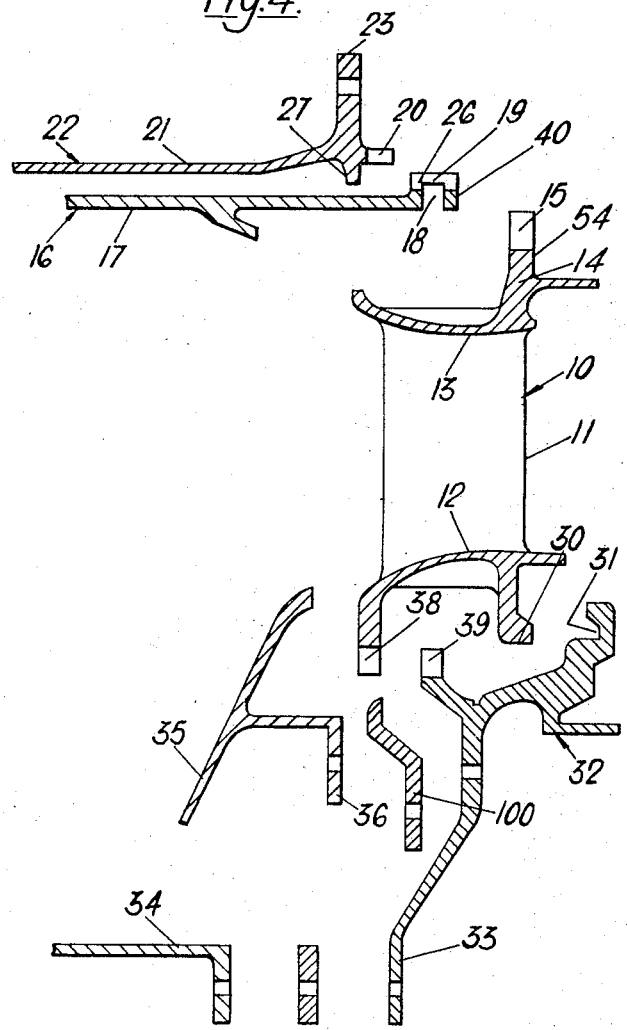
FIGURE 4 is a view similar to FIGURE 1 but showing the components in dismantled condition.

As shown in FIGURE 5, the engine includes a compressor, of which the final rotor stage is indicated at 50, an annular combustion chamber 16, enclosed in an annular air casing 22, and a turbine of which the first rotor stage is indicated at 29. The flow of gas from the combustion chamber to the turbine is controlled by a ring 10 of turbine inlet guide vanes. The compressor has a casing 51 bolted to the air casing at 52, and the turbine has a casing 25, bolted to the air casing at 102.

As shown in FIGURES 1 to 4, the ring 10 of turbine inlet guide vanes consists of segments, each of which includes a plurality of vanes 11, and an inner and an outer shroud 12 and 13, respectively. Each outer shroud includes a flange 14 lying at the downstream end of the vanes and extended radially outwards as a dog 15. The annular combustion chamber 16 has an outer wall 17 extended over the vanes and provided with a circumferential channel 26 defining a groove 18 engaged by the flange 14. The dog 15 passes through an opening 19 in the base of the channel 26, and engages one of an annular series of slots 20 in an adjacent portion of an outer wall 21 of the air casing 22 surrounding the combustion chamber. The wall 21 includes a flange 23 bolted to a flange 24 of the turbine casing 25. When the flanges 23, 24 are in the bolted-together condition, the exterior of the channel 26 is trapped between extensions 27, 28 of the casings 22, 25 respectively. The turbine casing and the combustion chamber casing (i.e., the air casing) together constitute support structure, and it will be seen that they are releasably joined together in a plane approximating to the plane of the ring of turbine inlet vanes.

The inner shroud 12 of each blade segment 10 is provided with an extension 30 engaged by a groove 31 in a releasable locking member in the form of a ring 32 having a flange 33 bolted to an inner wall 34 of the air casing 22. An inner wall 35 of the combustion chamber 16 includes a flange 36 bolted to the ring 32. The same bolts 103 also secure an annular plate 100, and the inner shrouds 12 are located axially between the groove 31 of the ring 32 and the rim of the plate 100. Further, each shroud 12 is located circumferentially by a radial dog 38 engaging one of an annular series of slots 39 in the ring 32.

FIGURE 4 shows the components before assembly. The channel 26 of the combustion chamber 16 lies clear of the extension 27 of the air casing 22 and the segment 10 lies radially inwards of the groove 18 and opening 19. It is to be understood that for assembly the engine is positioned so as to rest on the compressor end thereof, as shown in FIGURE 5, i.e., the right hand of FIGURE 4 is uppermost, so that the operator looks down onto the illustrated ends of the combustion chamber and air casing. As a first step, the annular plate 100 is rested on the flange 36. Then, assuming that the entire set of segments 10 has to be assembled, the segments are pushed one after the other into the groove 18 and into engagement with their respective openings 19. As shown in FIGURE 2, the slot openings 19 are wider than the dogs 15 to allow a certain amount of circumferential motion of the segments, which is desirable at this stage of the assembly to enable the segments to be pushed together circumferentially taking up all clearances between them. (Each clearance is about 0.006 inch when cold.) In this way, when the last segment comes to be inserted there is sufficient clearance for it to pass freely into position. When all the segments are in position, the inner shrouds are resting on the plate 100. Then the combustion chamber is lowered for each of the dogs 15 to engage its respective slot 20 in the air casing 22, and for the channel 26 to rest on the extension 27. Thereafter, the ring 32 is lowered into position for the slots 39 thereof to engage the dogs 38 of the segments and for the groove 31 to engage the extensions 30. Bolts 103, 104 are inserted to secure the ring at the flanges 36, 33, and after assembly of the rotor 29, the turbine casing 25 (FIGURE 1) is bolted to the flange 23 by bolts 102.

The dimensions of the various parts are such that, when finally assembled, the circumferential play of the dogs 15, 38 in the slots 20 and 39, and the axial play of the flange 14 in the groove 18 are all of the order of 0.002 inch. The same applies to the axial clearance between the channel 26 and the elements 27, 28. Radial freedom at 30, 31 is virtually nil, and axial freedom between 31, 100 is nil to 0.002 inch.

Thus the inner shrouds are located axially, radially and circumferentially, and the outer shrouds are located axially and circumferentially, while radial expansion of the vanes 11 is accommodated. At the same time, the inner wall 35 of the combustion chamber is fixedly supported, and the outer wall 17 is located against axial and circumferential movement.

It will be seen that, during operation of the engine, the downstream face 54 (FIGURE 4) of the flange 14 on each outer shroud is pushed downstream against the downstream side wall 40 of the chanel 26 which is part of the combustion chamber, by virtue of the axial forces acting on the segments due to the flow of the combustion gases and the pressure drop across the vanes. In one engine arranged in this way, the axial components of the forces on the vanes, spread between the outer and inner shrouds, total about 6000 lbs. There is thus a substantial force exerted by the outer shrouds on the combustion chamber. In turn, the side wall 40 of the channel is pushed downstream by the flanges 14 against the extension 28 of the turbine casing 25. Thereby the combustion chamber as a whole is urged against the abutment constituted by the extension 28, and is steadied against the aerodynamic buffeting to which it is subjected in operation. Thus good support for the combustion chamber is combined with the easy facility for removal and insertion of the segments which is desirable, particularly during servicing of the engine.

The invention can also be applied to engines in which there is an annular series of combustion cans, the cans being in a common annular air casing and being united downstream in a common annular outlet. The expression "combustion chamber" in the following claims is to be understood as embracing an annular series of combustion cans.

We claim:

1. A gas turbine engine including a combustion chamber; a ring of axial flow turbine inlet vanes, the ring consisting of segments, each of which includes at least one vane extending from an outer shroud, a support structure having an abutment surface facing upstream; the combustion chamber being in engagement with the abutment surface, and each outer shroud having a face which is in engagement with the combustion chamber and during operation of the engine serves to transmit a force in the downstream direction from that shroud to the combustion chamber.

2. An engine according to claim 1, in which each outer shroud includes a dog which extends radially outwards from the shroud through an opening in an outer wall of the combustion chamber.

3. An engine according to claim 2, in which each dog has a face which is in engagement with the support structure and during operation of the engine serves to transmit a force in the circumferential direction from that dog to the support structure.

4. An engine according to claim 1, in which the segments are unrestrained against radially inward movement by the support member and combustion chamber, and including separate releasable means serving to restrain radially inward movement of the segments.

5. An engine according to claim 4, in which each segment includes an inner shroud, and the means serving to restrain radially inward movement of the segments is an annular locking member engaging the inner shrouds of all the segments.

6. An engine according to claim 5, in which the locking member resists radial and axial movement of the inner shrouds, and is itself releasably secured against axial movement to the support structure.

7. An engine according to claim 6, in which the locking member also resists circumferential movement of the inner shrouds.

8. An engine according to claim 1, in which the support structure is constituted by a turbine casing, and a combustion chamber casing, which are releasably joined together in a plane approximating to the plane of the ring of turbine inlet vanes, the abutment surface engaged by the combustion chamber being on the turbine casing.

9. An engine according to claim 3, in which the support structure is constituted by a turbine casing, and a combustion chamber casing, which are releasably joined together in a plane approximating to the plane of the ring of turbine inlet vanes, the abutment surface engaged by the combustion chamber being on the turbine casing, and in which each dog is in engagement with the combustion chamber casing and transmits the circumferential force to the combustion chamber casing.

References Cited

UNITED STATES PATENTS

| | | | |
|---|---|---|---|
| 2,488,875 | 11/1949 | Morley | 253—69 |
| 2,625,367 | 1/1953 | Rainbow et al. | 253—78 XR |
| 3,071,346 | 1/1963 | Broffitt | 253—78 |

JULIUS E. WEST, *Primary Examiner.*